US012794562B2

(12) United States Patent
Sklanka et al.

(10) Patent No.: US 12,794,562 B2
(45) Date of Patent: Nov. 10, 2026

(54) OPTICAL DATA TRANSMISSION THROUGH AIRCRAFT WINDOW

(71) Applicant: The Boeing Company, Arlington, VA (US)

(72) Inventors: Bernard Joseph Sklanka, Maple Valley, WA (US); Brandon Bertolucci, Seattle, WA (US)

(73) Assignee: The Boeing Company, Arlington, VA (US)

( * ) Notice: Subject to any disclaimer, the term of this patent is extended or adjusted under 35 U.S.C. 154(b) by 261 days.

(21) Appl. No.: 18/238,519

(22) Filed: Aug. 27, 2023

(65) Prior Publication Data

US 2025/0070887 A1 Feb. 27, 2025

(51) Int. Cl.

*H04B 10/67* (2013.01)
*B64D 11/00* (2006.01)
*H04B 10/69* (2013.01)
*H04B 10/40* (2013.01)
*H04B 10/50* (2013.01)

(52) U.S. Cl.

CPC ....... *H04B 10/671* (2013.01); *B64D 11/0015* (2013.01); *H04B 10/40* (2013.01); *H04B 10/50* (2013.01); *H04B 10/697* (2013.01)

(58) Field of Classification Search

None

See application file for complete search history.

(56) References Cited

U.S. PATENT DOCUMENTS

| | | | | |
|---|---|---|---|---|
| 5,359,446 A | 10/1994 | Johnson et al. | | |
| 5,546,325 A * | 8/1996 | Aulet | H04B 10/07 | 398/202 |
| 6,353,491 B1 * | 3/2002 | Tanaka | H04B 10/40 | 398/139 |

(Continued)

OTHER PUBLICATIONS

Borkar, A., et al., "Optical Wireless Sensor Network Design for a Conducting Chamber", Local Computer Networks Lcn), 2011 IEEE Th Conference on, IEEE, Oct. 4, 2011, pp. 990-993, XP032081815, DOI: 10.1109/LCN.2011.6115583.

(Continued)

*Primary Examiner* — Darren E Wolf
(74) *Attorney, Agent, or Firm* — Harrity & Harrity, LLP

(57) ABSTRACT

A data transmission system includes a sensor attached to an aircraft exterior and configured to generate sensor data. An external housing is attached to an exterior portion of an aircraft window. The external housing includes a digital-to-optical convertor configured to convert the sensor data into optical signals. The external housing also includes a transmitting optical device configured to transmit the optical signals through the aircraft window. An internal housing is attached to an interior portion of the aircraft window. The internal housing includes an optical receiver configured to receive the optical signals transmitted through the aircraft window. The internal housing also includes an optical-to-digital convertor configured to convert the optical signals received from the optical receiver into second sensor data. The second sensor data is representative of the detected condition. A data acquisition system internal to the aircraft is configured to receive the second sensor data.

20 Claims, 4 Drawing Sheets

(56) References Cited

U.S. PATENT DOCUMENTS

| | | | | |
|---|---|---|---|---|
| 2013/0336646 | A1* | 12/2013 | Cabaniss | G01J 3/0237 398/16 |
| 2014/0207314 | A1* | 7/2014 | Kou | B64D 45/00 701/14 |
| 2014/0308044 | A1* | 10/2014 | Heidler | H04B 10/808 398/115 |
| 2017/0195054 | A1* | 7/2017 | Ashrafi | H04B 10/2581 |
| 2017/0245945 | A1* | 8/2017 | Zuhars | A61B 90/39 |
| 2019/0081706 | A1 | 3/2019 | Neilson et al. | |
| 2020/0213012 | A1 | 7/2020 | Laughlin | |
| 2021/0001999 | A1* | 1/2021 | Massa | G06T 3/4038 |
| 2021/0143907 | A1* | 5/2021 | Engelen | H04B 10/116 |
| 2021/0247779 | A1* | 8/2021 | Huynh | B64C 13/18 |

OTHER PUBLICATIONS

Extended European Search Report for European Application No. EP24182608 dated Dec. 11, 2024, 8 pages.

* cited by examiner

OPTICAL DATA TRANSMISSION THROUGH AIRCRAFT WINDOW

FIELD

The present disclosure generally relates to transmitting sensor data, and more particularly, to transmitting sensor data from an aircraft exterior to an aircraft interior.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Aircrafts often use external sensors to detect environmental conditions. After sensing a particular environmental condition, a sensor can provide sensor data, indicative of the particular environmental data, to an internal component of the aircraft, such as an internal computing system. Typically, to provide the sensor data to the internal component of the aircraft, a wire is routed through an opening in a pressure vessel of the aircraft. As a non-limiting examples, to provide the sensor data to the internal component of the aircraft, the wire can be routed underneath an aircraft door, through a specialized aircraft window, etc. If there is a relatively large number of sensors providing sensor data to the internal aircraft component, it can become increasingly difficult and inefficient to route multiple wires through the pressure vessel of the aircraft. For example, the pressure vessel would need multiple openings to support a plurality of wires coupled to sensors and the internal component of the aircraft.

SUMMARY

The present application is directed to using optical signals to transmit data through aircraft windows during a flight. According to the present application, a sensor is attached to an aircraft exterior during flight. As non-limiting examples, the sensor can correspond to an accelerometer, a microphone, a temperature sensor, a camera, etc. The sensor can be used to detect a condition. As non-limiting examples, the sensor can detect an acceleration of the aircraft if the sensor corresponds to an accelerometer, the sensor can detect a noise external to the aircraft if the sensor corresponds to a microphone, etc. In response to detecting the condition, the sensor can generate sensor data indicative of the detected condition.

An external housing is attached to an exterior portion of a window of the aircraft using a flight-capable adhesive. Within the external housing is a digital-to-optical convertor and a transmitting optical device. The sensor uses an exterior data cable to provide the sensor data to the digital-to-optical convertor within the external housing, and the digital-to-optical convertor converts the sensor data into optical signals having a frequency and amplitude indicative of the sensor data. In particular, the digital-to-optical convertor can determine the frequency and amplitude of the optical signals based on the sensor data. As a non-limiting example, if the sensor is a temperature sensor, the digital-to-optical convertor can generate first optical signals having a first frequency and a first amplitude if the sensor data indicates a first temperature was detected, the digital-to-optical convertor can generate second optical signals having a second frequency and a second amplitude if the sensor data indicates a second temperature was detected, etc. Thus, the digital-to-optical convertor can generate optical signals having distinct frequencies and amplitudes for each detected condition. The transmitting optical device can transmit the optical signals through the window of the aircraft.

An internal housing is attached to an interior portion of the window via an adhesive. Within the internal housing is an optical receiver and an optical-to-digital convertor. The optical receiver is physically aligned with the transmitting optical device such that the optical receiver receives the optical signals transmitted through the window of the aircraft from the transmitting optical device. According to one embodiment, the optical receiver and the transmitting optical device are aligned in such a manner as to maximize signal-to-noise levels of the optical signals. The optical-to-digital convertor converts the optical signals received from the optical receiver into second sensor data that is representative of the detected condition. In particular, the optical-to-digital convertor can generate the second sensor data representative of the detected condition based on the frequency and amplitude of the signals received by the optical receiver. Thus, the digital-to-optical convertor and the optical-to-digital convertor can use a similar conversion algorithm to convert sensor data into frequencies and amplitudes for optical signals, and vice versa. A data acquisition system (e.g., a computing device or a data recording device) within the aircraft can receive the second sensor data via an interior data cable.

Thus, the present application enables sensor data to be transmitted from the aircraft exterior to an aircraft interior while bypassing utilization of an opening in a pressure vessel of the aircraft. For example, by transmitting optical signals, representative of the sensor data, through the window of the aircraft, the use of physical wiring to transmit the sensor data from the aircraft exterior to the aircraft interior can be bypassed. In particular, the present application reduces the need for aircraft doors and aircraft windows to be wired for routing cables from the aircraft exterior to the aircraft interior. Furthermore, it should be appreciated that the optical signals transmitted through the window of the aircraft will not interfere with electrical and mechanical restrictions for the aircraft. For example, the optical signals will not interfere with other communication frequencies used by the aircraft to communicate with other aircrafts, controllers, and systems.

The present application can also achieve cost savings for flight testing and measurements, as a reduced amount of material (e.g., wires) are need to communicate sensor data from the aircraft exterior to the aircraft interior. Additionally, because external-to-internal wiring can be bypassed, sensors can be places at more locations on the aircraft exterior (e.g., difficult to reach locations) that are not proximate to aircraft penetrations suitable for external-to-internal wiring.

In one aspect, the present application discloses a data transmission system. The data transmission system includes a sensor attached to an external component of an aircraft. The sensor is configured to generate sensor data representative of a detected condition. The data transmission system also includes an external housing attached to an exterior portion of an aircraft window of the aircraft. The external housing includes a digital-to-optical convertor configured to convert the sensor data into one or more optical signals. The external housing also includes a transmitting optical device configured to transmit the one or more optical signals through the aircraft window. The data transmission system also includes an internal housing attached to an interior portion of the aircraft window. The internal housing includes an optical receiver configured to receive the one or more optical signals transmitted through the aircraft window from the transmitting optical device. The internal housing also includes an optical-to-digital convertor configured to convert the one or more optical signals received from the optical receiver into second sensor data. The second sensor data is representative of the detected condition. The data transmission system also includes a data acquisition system internal to the aircraft. The data acquisition system is configured to receive the second sensor data.

In another aspect, the present application discloses a method. The method includes generating, by a sensor external to an aircraft, sensor data representative of a detected condition. The method also includes converting, by a digital-to-optical convertor, the sensor data into one or more optical signals. The digital-to-optical convertor is within an external housing attached to an exterior portion of an aircraft window of the aircraft. The method also includes transmitting, by a transmitting optical device, the one or more optical signals through the aircraft window. The transmitting optical device is within the external housing. The method also includes receiving, by an optical receiver, the one or more optical signals transmitted through the aircraft window. The optical receiver is within an internal housing attached to an interior portion of the aircraft window. The method further includes converting, by an optical-to-digital convertor, the one or more optical signals received from the optical receiver into second sensor data. The second sensor data is representative of the detected condition. The method also includes receiving, by a data acquisition system, the second sensor data.

In another aspect, the present application discloses an aircraft. The aircraft includes an aircraft exterior, an aircraft window, and a sensor attached to the aircraft exterior. The sensor is configured to generate sensor data representative of a detected condition. The aircraft also includes an external housing attached to an exterior portion of the aircraft window. The external housing includes a digital-to-optical convertor configured to convert the sensor data into one or more optical signals. The external housing also includes a transmitting optical device configured to transmit the one or more optical signals through the aircraft window. The aircraft also includes an internal housing attached to an interior portion of the aircraft window. The internal housing includes an optical receiver configured to receive the one or more optical signals transmitted through the aircraft window from the transmitting optical device. The internal housing also includes an optical-to-digital convertor configured to convert the one or more optical signals received from the optical receiver into second sensor data. The second sensor data is representative of the detected condition. The aircraft also includes a data acquisition system configured to receive the second sensor data.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
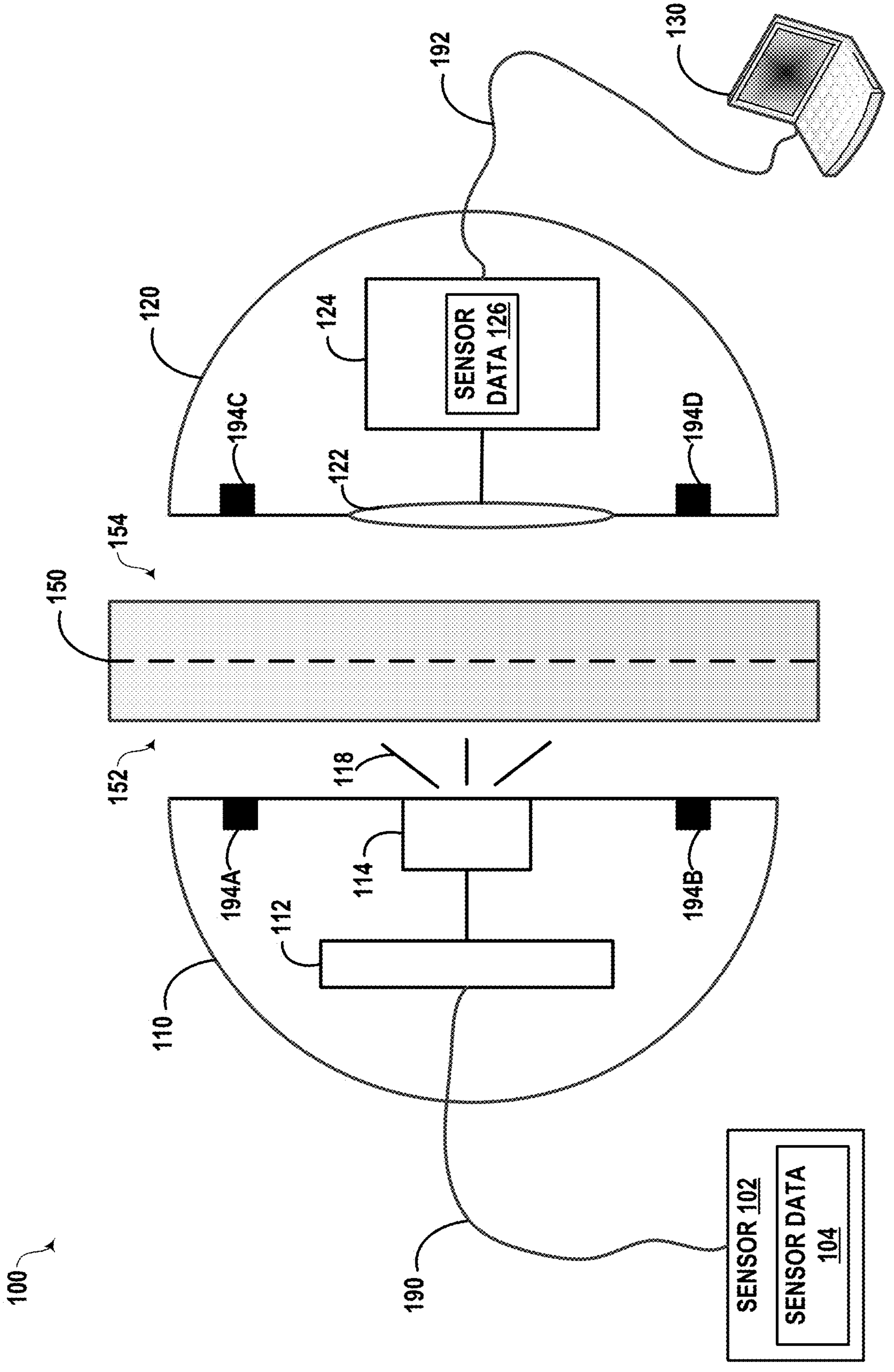
FIG. 1 illustrates a data transmission system that is operable to transmit optical signals representative of sensor data through an aircraft window, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, alignment guides are illustrated and associated with reference number 194. When referring to a particular one of the alignment guides, such as the alignment guide 194A, the distinguishing letter "A" is used. However, when referring to any arbitrary one of the alignment guides or to the alignment guides as a group, the reference number 194 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, a data transmission system 100 that is operable to transmit optical signals representative of sensor data through an aircraft window is illustrated, in accordance with an exemplary embodiment. The data transmission system 100 includes a sensor 102, an external housing 110, an internal housing 120, and a data acquisition system 130. The external housing 110 is attached to an exterior portion 152 of an aircraft window 150, and the internal housing 120 is attached to an interior portion 154 of the aircraft window 150. Thus, the external housing 110 is outside of an aircraft, such as the aircraft 300 of FIG. 3, and the internal housing 120 is inside the aircraft 300.

The sensor 102 can be attached to an external component of the aircraft 300 or an exterior 302 of the aircraft 300. The sensor 102 can be configured to detect one or more conditions and generate sensor data 104 indicative of the detected conditions. As a non-limiting example, the sensor 102 can correspond to an accelerometer and can generate sensor data 104 indicative of a detected acceleration of the aircraft 300. As another non-limiting example, the sensor 102 can correspond to a microphone and can generate sensor data 104 indicative of a detected noise proximate to the aircraft 300. As another non-limiting example, the sensor 102 can correspond to a temperature sensor and can generate sensor data 104 indicative of a detected temperature outside of the aircraft 300. It should be understood that the above examples are merely for illustrative purposes and should not be construed as limiting. In other embodiments, the sensor 102 can detect other conditions (e.g., radiance, velocity, pressure, etc.) and generate sensor data 104 indicative of the detected conditions.

The sensor 102 can send the sensor data 104 to one or more components within the external housing 110 via an exterior data cable 190. For example, the external housing 110 includes a digital-to-optical convertor 112 and a transmitting optical device 114. The exterior data cable 190 can be coupled to the sensor 102 and to digital-to-optical convertor 112 within the external housing 110. Thus, the sensor 102 can provide the sensor data 104 to the digital-to-optical convertor 112 via the exterior data cable 190.

The digital-to-optical convertor 112 can be configured to convert the sensor data 104 into one or more optical signals 118 that are representative of the detected condition indicated by the sensor data 104. For example, for each distinct detected condition indicated by the sensor data 104, the digital-to-optical convertor 112 can determine a frequency and/or amplitude for the one or more signals 118 that, when communicated, represents the detected condition. As a non-limiting example, if the sensor 102 is a temperature sensor, the digital-to-optical convertor 112 can generate first optical signals 118 having a first frequency and a first amplitude if the sensor data 104 indicates a first temperature was detected, the digital-to-optical convertor 112 can generate second optical signals 118 having a second frequency and a second amplitude if the sensor data 104 indicates a second temperature was detected, etc. Thus, the digital-to-optical convertor 112 can generate optical signals 118 having distinct frequencies and amplitudes for each detected condition.

Although the distinct frequency of the optical signals 118 can be used to communicate the detected condition indicated by the sensor data 104, a frequency range of the optical signals 118 can fall within different light spectrums. As non-limiting examples, the one or more optical signals 118 can include visible light signals, ultraviolet signals, infrared signals, etc. Additionally, the optical signals 118 can be generated at a relatively high data rate. As a non-limiting example, the digital-to-optical convertor 112 can generate high-rate data (e.g., approximately 50,000 samples per second), and as described below, pass the high-rate data through the aircraft window 150.

The transmitting optical device 114 can be configured to transmit the one or more optical signals 118 through the aircraft window 150. According to one implementation, the transmitting optical device 114 includes one or more lasers configured to transmit the optical signals 118 through the aircraft window 150. According to another implementation, the transmitting optical device 114 includes one or more light emitting diodes (LEDs) configured to transmit the optical signals 118 through the aircraft window 150. It should be understood that the above examples of the transmitting optical device 114 are merely for illustrative purposes and should not be construed as limiting. In other embodiments, the transmitting optical device 114 can correspond to any device that can emit optical signals 118.

The internal housing 120 includes an optical receiver 122 and an optical-to-digital convertor 124. The optical receiver 122 can be aligned to receive the one or more optical signals 118 transmitted through the aircraft window 150 from the transmitting optical device 114. To align the optical receiver 122 to receive the one or more optical signals 118, a position of the external housing 110 on the exterior portion 152 of the aircraft window 150 can be aligned with a position of the internal housing 120 on the interior portion 154 of the aircraft window 150. For example, the external housing 110 can include a plurality of alignment guides 194A, 194B (e.g., alignment markers), and the internal housing 120 can include a plurality of alignment guides 194C, 194D. By aligning the alignment guides 194A, 194B of the external housing 110 with the corresponding alignment guides 194C, 194D of the internal housing 120, the optical receiver 122 of the internal housing 120 is aligned to the transmitting optical device 114 of the external housing 110 to maximize (or substantially maximize) signal-to-noise levels of the optical signals 118.

In response to aligning the external housing 110 with the internal housing 120, the optical receiver 122 can be configured to receive the one or more optical signals 118 transmitted through the aircraft window 150 from the transmitting optical device 114. The optical receiver 122 can include a spectrometer, a photocell, a camera, etc. It should be understood that the above examples of the optical receiver 122 are merely for illustrative purposes and should not be construed as limiting. In other embodiments, the optical receiver 122 can be any light-sensitive transducer that is capable of detecting (e.g., receiving) the one or more optical signals 118.

The optical-to-digital convertor 124 can be configured to convert the one or more optical signals 118 received from the optical receiver 122 into second sensor data 126. The second sensor data 126 can be similar to the sensor data 104 generated by the sensor 102. For example, the second sensor data 126 can be representative of the detected condition by the sensor 102. To generate the second sensor data 126, the optical-to-digital convertor 124 can identify the frequency and/or amplitude of the optical signals 118 and map the frequency and/or amplitude to the second sensor data 126. In some embodiments, the optical-to-digital convertor 124 uses the same conversion algorithm as the digital-to-optical convertor 112 to convert the optical signals 118 into the second sensor data 126. For example, the optical-to-digital convertor 124 can perform an inverse operation with respect to the operation performed by the digital-to-optical convertor 112.

The optical-to-digital convertor 124 can provide the second sensor data 126 to a data acquisition system 130 that is internal to the aircraft 300. For example, the optical-to-digital convertor 124 can use an interior data cable 192 to provide the second sensor data 126 to the data acquisition system 130. The data acquisition system 130 can correspond to a computing device or data recording device within the aircraft 300.

Thus, the data transmission system 100 of FIG. 1 enables the sensor data 104 to be transmitted from an aircraft exterior to an aircraft interior without penetrating a pressure vessel of the aircraft 300 for wiring. For example, by transmitting optical signals 118, representative of the sensor data 104, through the aircraft window 150, the use of physical wiring and cabling to transmit the sensor data 104 from the aircraft exterior to the aircraft interior can be bypassed. Furthermore, it should be appreciated that the optical signals 118 transmitted through the aircraft window 150 will not interfere with electrical and mechanical restrictions for the aircraft 300. For example, the optical signals 118 will not interfere with other communication frequencies used by the aircraft 300 to communicate with other aircrafts, controllers, and systems.

Figure 2:
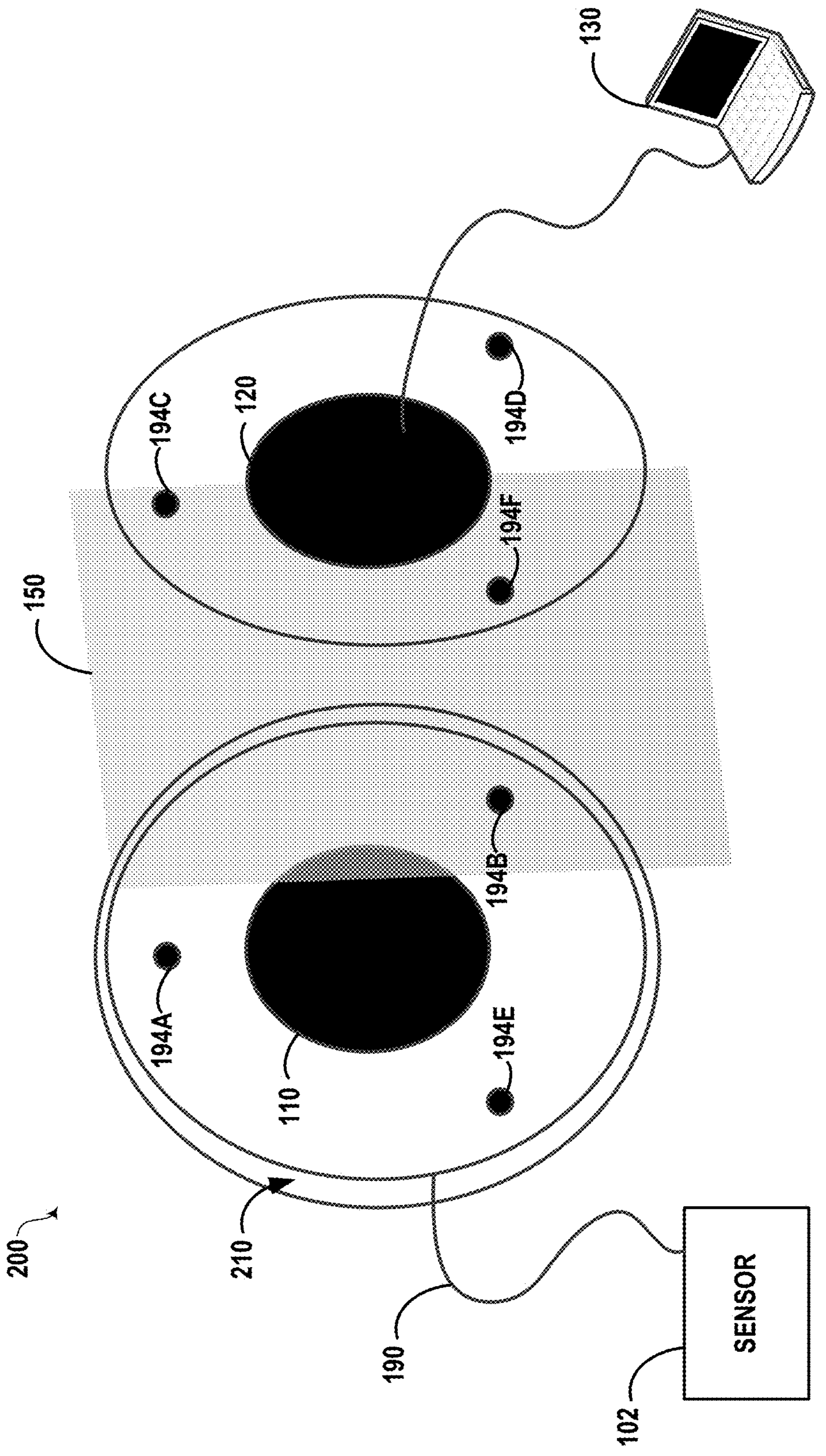
FIG. 2 illustrates a data transmission system that is operable to transmit optical signals representative of sensor data through an aircraft window, according to an exemplary embodiment.

Referring to FIG. 2, a data transmission system 200 that is operable to transmit optical signals representative of sensor data through an aircraft window is illustrated, in accordance with an exemplary embodiment. The data transmission system 200 includes the sensor 102, the external housing 110, the internal housing 120, and the data acquisition system 130. The external housing 110 is attached to an exterior portion of the aircraft window 150 using a flight-capable adhesive 210, and the internal housing 120 is attached to an interior portion of the aircraft window 150. Thus, the external housing 110 is outside of the aircraft 300, and the internal housing 120 is inside the aircraft 300.

In a similar manner as described with respect to FIG. 1, the sensor 102 can be attached to an external component of the aircraft or an exterior of the aircraft 300. The sensor 102 can be configured to detect one or more conditions and generate sensor data 104 indicative of the detected conditions. The sensor 102 can send the sensor data 104 to one or more components within the external housing 110 via an exterior data cable 190.

Although not illustrated in FIG. 2, the external housing 110 includes the digital-to-optical convertor 112 and the transmitting optical device 114. The digital-to-optical convertor 112 and the transmitting optical device 114 can operate in a substantially similar manner as described with respect to FIG. 1. For example, the digital-to-optical convertor 112 can be configured to convert the sensor data 104 into the one or more optical signals 118, and the transmitting optical device 114 can be configured to transmit the one or more optical signals 118 through the aircraft window 150.

Although not illustrated in FIG. 2, the internal housing 120 includes the optical receiver 122 and the optical-to-digital convertor 124. The optical receiver 122 and the optical-to-digital convertor 124 can operate in a substantially similar manner as described with respect to FIG. 1. For example, the optical receiver 122 can be configured to receive the one or more optical signals 118 transmitted through the aircraft window 150 from the transmitting optical device 114, and the optical-to-digital convertor 124 can be configured to convert the one or more optical signals 118 received from the optical receiver 122 into the second sensor data 126.

The position of the external housing 110 on the exterior portion 152 of the aircraft window 150 can be aligned with a position of the internal housing 120 on the interior portion 154 of the aircraft window 150. For example, the external housing 110 can include a plurality of alignment guides 194A, 194B, 194E (e.g., alignment markers), and the internal housing 120 can include a plurality of alignment guides 194C, 194D, 194F. By aligning the alignment guides 194A, 194B, 194E of the external housing 110 with the corresponding alignment guides 194C, 194D, 194F of the internal housing 120, the optical receiver 122 of the internal housing 120 is aligned to the transmitting optical device 114 of the external housing 110 to maximize (or substantially maximize) signal-to-noise levels of the optical signals 118.

The optical-to-digital convertor 124 can provide the second sensor data 126 to the data acquisition system 130 that is internal to the aircraft 300. Thus, the data transmission system 200 of FIG. 2 enables the sensor data 104 to be transmitted from an aircraft exterior to an aircraft interior without penetrating the pressure vessel of the aircraft 300 for wiring. For example, by transmitting optical signals 118, representative of the sensor data 104, through the aircraft window 150, the use of physical wiring and cabling to transmit the sensor data 104 from the aircraft exterior to the aircraft interior can be bypassed. Furthermore, it should be appreciated that the optical signals 118 transmitted through the aircraft window 150 will not interfere with electrical and mechanical restrictions for the aircraft 300. For example, the optical signals 118 will not interfere with other communication frequencies used by the aircraft 300 to communicate with other aircrafts, controllers, and systems.

Figure 3:
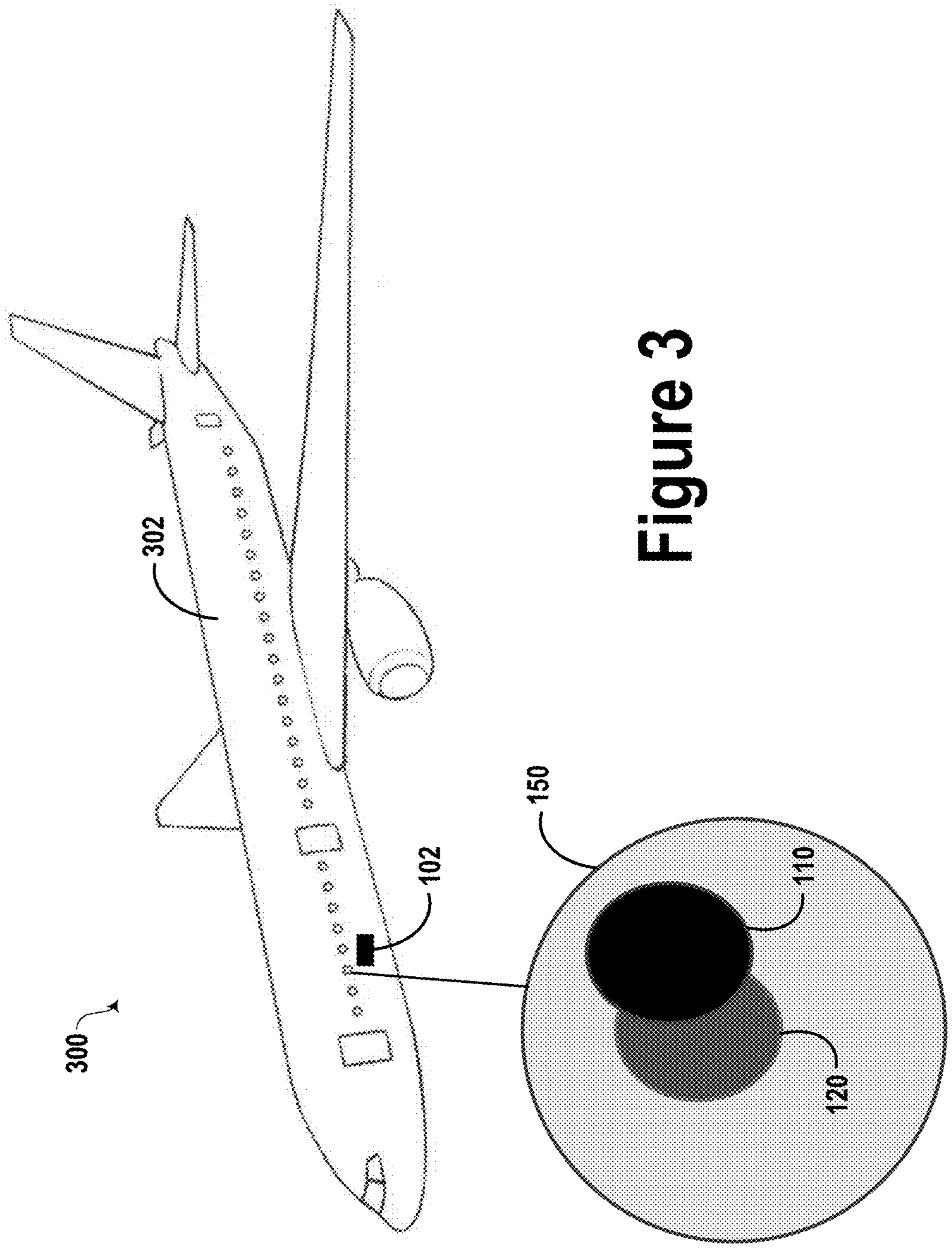
FIG. 3 illustrates an aircraft, according to an exemplary embodiment.

Referring to FIG. 3, an aircraft 300 is illustrated, in accordance with an exemplary embodiment.

In FIG. 3, the sensor 102 is attached to an aircraft exterior 302 of the aircraft 300 proximate to the aircraft window 150. The sensor 102 can be configured to detect one or more conditions and generate sensor data 104 indicative of the detected conditions. The sensor 102 can send the sensor data 104 to one or more components within the external housing 110 via the exterior data cable 190.

The external housing 110 is attached to an exterior portion of the aircraft window 150 using the flight-capable adhesive 210, and the internal housing 120 is attached to an interior portion of the aircraft window 150. Thus, the external housing 110 is outside of the aircraft 300, and the internal housing 120 is inside the aircraft 300.

Although not illustrated in FIG. 3, the external housing 110 includes the digital-to-optical convertor 112 and the transmitting optical device 114. The digital-to-optical convertor 112 and the transmitting optical device 114 can operate in a substantially similar manner as described with respect to FIG. 1. For example, the digital-to-optical convertor 112 can be configured to convert the sensor data 104 into the one or more optical signals 118, and the transmitting optical device 114 can be configured to transmit the one or more optical signals 118 through the aircraft window 150.

Although not illustrated in FIG. 3, the internal housing 120 includes the optical receiver 122 and the optical-to-digital convertor 124. The optical receiver 122 and the optical-to-digital convertor 124 can operate in a substantially similar manner as described with respect to FIG. 1. For example, the optical receiver 122 can be configured to receive the one or more optical signals 118 transmitted through the aircraft window 150 from the transmitting optical device 114, and the optical-to-digital convertor 124 can be configured to convert the one or more optical signals 118 received from the optical receiver 122 into the second sensor data 126.

By transmitting optical signals 118, representative of the sensor data 104, through the aircraft window 150, the use of physical wiring and cabling to transmit the sensor data 104 from the aircraft exterior 302 to the aircraft interior can be bypassed. Furthermore, it should be appreciated that the optical signals 118 transmitted through the aircraft window 150 will not interfere with electrical and mechanical restrictions for the aircraft 300. For example, the optical signals 118 will not interfere with other communication frequencies used by the aircraft 300 to communicate with other aircrafts, controllers, and systems.

Figure 4:
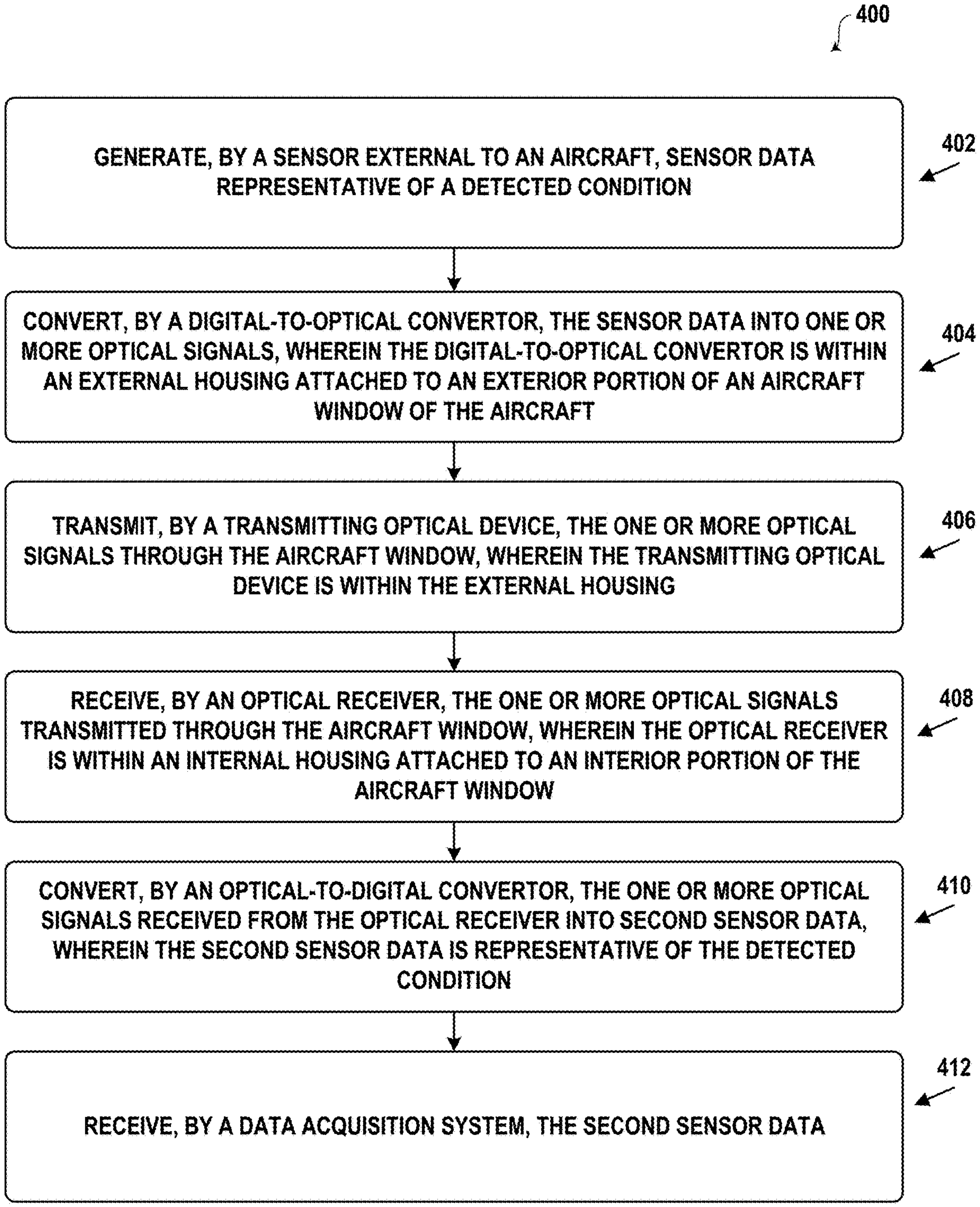
FIG. 4 is a flowchart of an example of an implementation of a method, according to an exemplary embodiment.

FIG. 4 illustrates a flow chart of a method 400, according to an exemplary embodiment. The method 400 can be performed by the data transmission system 100 of FIG. 1 and/or the data transmission system 200 of FIG. 2.

The method 400 includes generating, by a sensor external to an aircraft, sensor data representative of a detected condition, at block 402. For example, referring to FIG. 1, the sensor 102 (external to the aircraft 300) generates the sensor data 104 representative of a detected condition.

The method 400 also includes converting, by a digital-to-optical convertor, the sensor data into one or more optical signals, at block 404. The digital-to-optical convertor is within an external housing attached to an exterior portion of an aircraft window of the aircraft. For example, referring to FIG. 1, the digital-to-optical convertor 112 converts the sensor data 104 into one or more optical signals 118. The digital-to-optical convertor 112 is within the external housing 110 attached to the exterior portion 152 of the aircraft window 150 of the aircraft 300. According to one implementation of the method 400, the one or more optical signals 118 include visible light signals, ultraviolet signals, or infrared signals.

The method 400 also includes transmitting, by a transmitting optical device, the one or more optical signals through the aircraft window, at block 406. The transmitting optical device is within the external housing. For example, referring to FIG. 1, the transmitting optical device 114 transmits the one or more optical signals 118 through the aircraft window 150. The transmitting optical device 114 is within the external housing 110.

The method 400 also includes receiving, by an optical receiver, the one or more optical signals transmitted through the aircraft window, at block 408. The optical receiver is within an internal housing attached to an interior portion of the aircraft window. For example, referring to FIG. 1, the optical receiver 122 receives the one or more optical signals 118 transmitted through the aircraft window 150. The optical receiver 122 is within the internal housing 120 attached to the interior portion 154 of the aircraft window 150.

The method 400 also includes converting, by an optical-to-digital convertor, the one or more optical signals received from the optical receiver into second sensor data, at block 410. The second sensor data is representative of the detected condition. For example, referring to FIG. 1, the optical-to-digital convertor 124 converts the one or more optical signals 118 received from the optical receiver 122 into the second sensor data 126. The second sensor data 126 is representative of the detected condition. According to one implementation of the method 400, the second sensor data 126 is similar to the sensor data 104.

The method 400 also includes receiving, by a data acquisition system, the second sensor data, at block 412. For example, the data acquisition system 130 receives the second sensor data 126 from the optical-to-digital convertor 124.

According to one implementation of the method 400, the transmitting optical device 114 includes one or more lasers. According to one implementation of the method 400, the transmitting optical device 114 includes one or more LEDs. According to one implementation of the method 400, the optical receiver 122 includes a spectrometer, a photocell, or a camera.

According to one implementation of the method 400, the external housing 110 is attached to the exterior portion 152 of the aircraft window 150 via a flight-capable adhesive 210. According to one implementation of the method 400, a position of the external housing 110 on the exterior portion 152 of the aircraft window 150 is aligned with a position of the internal housing 120 on the interior portion 154 of the aircraft window 150.

The method 400 of FIG. 4 enables the sensor data 104 to be transmitted from an aircraft exterior to an aircraft interior without penetrating the pressure vessel of the aircraft 300 for wiring. For example, by transmitting optical signals 118, representative of the sensor data 104, through the aircraft window 150, the use of physical wiring and cabling to transmit the sensor data 104 from the aircraft exterior to the aircraft interior can be bypassed. Furthermore, it should be appreciated that the optical signals 118 transmitted through the aircraft window 150 will not interfere with electrical and mechanical restrictions for the aircraft 300. For example, the optical signals 118 will not interfere with other communication frequencies used by the aircraft 300 to communicate with other aircrafts, controllers, and systems.

Although the systems are described herein with specific reference to space systems or aerospace vehicles, in other embodiments, the system can be a vehicle other than a spacecraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A data transmission system comprising:
a sensor attached to an external component of an aircraft, the sensor configured to generate first sensor data at a first temperature and second sensor data at a second temperature,
wherein the first sensor data or the second sensor data is representative of a detected condition,
wherein the first sensor data does not equal the second sensor data, and
wherein the first temperature does not equal the second temperature;
an external housing attached to an exterior portion of an aircraft window of the aircraft, the external housing comprising:
a digital-to-optical convertor configured to convert one or more of:
the first sensor data into a first optical signal with a first frequency, and
the second sensor data into a second optical signal with a second frequency,
wherein the first frequency is not equal the second frequency; and
a transmitting optical device configured to transmit the first optical signal or the second optical signal through the aircraft window; and
an internal housing attached to an interior portion of the aircraft window, the internal housing comprising:
an optical receiver configured to receive the first optical signal or the second optical signal transmitted through the aircraft window from the transmitting optical device;
an optical-to-digital convertor configured to convert the first optical signal or the second optical signal received from the optical receiver into third sensor data or fourth sensor data,
wherein the third sensor data is representative of the detected condition; and
a data acquisition system internal to the aircraft, the data acquisition system configured to receive the third sensor data or the fourth sensor data.

2. The data transmission system of claim 1,
wherein the third sensor data is representative of the detected condition based on an amplitude of the first optical signal received by the optical receiver.

3. The data transmission system of claim 1,
wherein the transmitting optical device comprises one or more lasers.

4. The data transmission system of claim 1,
wherein the transmitting optical device comprises one or more light emitting diodes (LEDs).

5. The data transmission system of claim 1,
wherein the external housing is attached to the exterior portion of the aircraft window via a flight-capable adhesive.

6. The data transmission system of claim 1,
wherein the first optical signal or the second optical signal comprise visible light signals, ultraviolet signals, or infrared signals.

7. The data transmission system of claim 1,
wherein a position of the external housing on the exterior portion of the aircraft window is aligned with a position of the internal housing on the interior portion of the aircraft window.

8. The data transmission system of claim 1, wherein the optical receiver comprises a spectrometer or a camera.

9. A method comprising:
generating, by a sensor external to an aircraft, first sensor data at a first temperature and second sensor data at a second temperature,
wherein the first sensor data or the second sensor data is representative of a detected condition,
wherein the first sensor data does not equal the second sensor data, and
wherein the first temperature does not equal the second temperature;
converting, by a digital-to-optical convertor, one or more of:
the first sensor data into a first optical signal with a first frequency, and
the second sensor data into a second optical signal with a second frequency,
wherein the first frequency is not equal the second frequency, and
wherein the digital-to-optical convertor is within an external housing attached to an exterior portion of an aircraft window of the aircraft;
transmitting, by a transmitting optical device, the first optical signal or the second optical signal through the aircraft window, wherein the transmitting optical device is within the external housing;
receiving, by an optical receiver, the first optical signal or the second optical signal transmitted through the aircraft window, wherein the optical receiver is within an internal housing attached to an interior portion of the aircraft window;

converting, by an optical-to-digital convertor, the first optical signal or the second optical signal received from the optical receiver into a third sensor data, wherein the third sensor data is representative of the detected condition; and receiving, by a data acquisition system, the third sensor data.

10. The method of claim 9, wherein the third sensor data is representative of the detected condition based on an amplitude of the first optical signal or the second optical signal received by the optical receiver.

11. The method of claim 9, wherein the transmitting optical device comprises one or more lasers.

12. The method of claim 9, wherein the transmitting optical device comprises one or more light emitting diodes (LEDs).

13. The method of claim 9, wherein the optical receiver comprises a spectrometer, a photocell, or a camera.

14. The method of claim 9, wherein the external housing is attached to the exterior portion of the aircraft window via a flight-capable adhesive.

15. The method of claim 9, wherein the first optical signal or the second optical signal comprise visible light signals, ultraviolet signals, or infrared signals.

16. The method of claim 9, wherein a position of the external housing on the exterior portion of the aircraft window is aligned with a position of the internal housing on the interior portion of the aircraft window.

17. An aircraft comprising:

an aircraft exterior;

an aircraft window;

a sensor attached to the aircraft exterior, the sensor configured to generate first sensor data at a first temperature and second sensor data at a second temperature, wherein the first sensor data or the second sensor data is representative of a detected condition;

wherein the first sensor data does not equal the second sensor data, and wherein the first temperature does not equal the second temperature;

an external housing attached to an exterior portion of the aircraft window, the external housing comprising:

a digital-to-optical convertor configured to convert one or more of:

the first sensor data into a first optical signal with a first frequency, and the second sensor data into a second optical signal with a second frequency, wherein the first frequency is not equal the second frequency; and a transmitting optical device configured to transmit the one or more of the first optical signal or the second optical signal through the aircraft window;

an internal housing attached to an interior portion of the aircraft window, the internal housing comprising:

an optical receiver configured to receive the first optical signal or the second optical signal transmitted through the aircraft window from the transmitting optical device, wherein the optical receiver comprises a spectrometer or a camera;

an optical-to-digital convertor configured to convert the first optical signal or the second optical signal received from the optical receiver into third sensor data or fourth sensor data, wherein the second sensor data is representative of the detected condition; and a data acquisition system configured to receive the third sensor data or the fourth sensor data.

18. The aircraft of claim 17, wherein a position of the external housing on the exterior portion of the aircraft window is aligned with a position of the internal housing on the interior portion of the aircraft window.

19. The aircraft of claim 17, wherein the first optical signal or the second optical signal comprise visible light signals, ultraviolet signals, or infrared signals.

20. The aircraft of claim 17, wherein the transmitting optical device comprises one or more light emitting diodes (LEDs).

* * * * *